United States Patent
Hall, Jr. et al.

(10) Patent No.: US 8,144,263 B2
(45) Date of Patent: Mar. 27, 2012

(54) PROJECTION LENS SYSTEM AND METHOD

(75) Inventors: Estill Thone Hall, Jr., Fishers, IN (US);
Jingbo Cai, Vista, CA (US); Eugene Murphy O'Donnell, Fishers, IN (US)

(73) Assignee: TTE Technology, Inc., Indianapolis, IN (US)

( * ) Notice: Subject to any disclaimer, the term of this patent is extended or adjusted under 35 U.S.C. 154(b) by 783 days.

(21) Appl. No.: 12/294,609

(22) PCT Filed: Mar. 31, 2006

(86) PCT No.: PCT/US2006/012466
§ 371 (c)(1),
(2), (4) Date: Sep. 25, 2008

(87) PCT Pub. No.: WO2007/114818
PCT Pub. Date: Oct. 11, 2007

(65) Prior Publication Data
US 2009/0059095 A1    Mar. 5, 2009

(51) Int. Cl.
*H04N 5/64* (2006.01)
*G02B 5/10* (2006.01)
*G02B 21/00* (2006.01)
*G03B 21/28* (2006.01)
*G03B 21/14* (2006.01)
*G03B 21/00* (2006.01)

(52) U.S. Cl. .......... 348/744; 359/859; 359/368; 353/77; 353/69; 353/31

(58) Field of Classification Search ........................ None
See application file for complete search history.

(56) References Cited

U.S. PATENT DOCUMENTS

| | | | |
|---|---|---|---|
| 3,586,421 A | 6/1971 | Walker | |
| 3,709,582 A | 1/1973 | Walker | |
| 4,182,549 A * | 1/1980 | Kreitzer | 359/752 |
| 4,301,468 A | 11/1981 | Alvarez | |
| 5,010,357 A | 4/1991 | Misawa | |
| 5,192,961 A | 3/1993 | Yoshida et al. | |
| 5,329,400 A | 7/1994 | Miyano | |
| 5,371,559 A * | 12/1994 | San-Nohe et al. | 353/31 |
| 5,671,993 A * | 9/1997 | Shikama | 353/77 |
| 6,185,041 B1 | 2/2001 | Tadic-Galeb et al. | |

(Continued)

FOREIGN PATENT DOCUMENTS
EP    0774112 A1    2/1996
(Continued)

OTHER PUBLICATIONS
PCT Search Report and the Written Opinion of the International Searching Authority, mailed Nov. 16, 2006.

(Continued)

*Primary Examiner* — Jefferey Harold
*Assistant Examiner* — Sean Haiem
(74) *Attorney, Agent, or Firm* — Fletcher Yoder PC

(57) ABSTRACT

The disclosed embodiments relate to a system and method for medium wide angle projection system. An exemplary embodiment of the present technique comprises an imaging system configured to create an image, at least one lens configured to produce a medium wide-angle representation of the image, and an aperture stop positioned to capture the medium wide-angle representation of the image from the at least one lens.

16 Claims, 6 Drawing Sheets

U.S. PATENT DOCUMENTS

| | | | |
|---|---|---|---|
| 6,540,361 B1 * | 4/2003 | Hayashi | 353/31 |
| 6,583,940 B2 | 6/2003 | Nishikawa et al. | |
| 7,086,742 B2 | 8/2006 | Hatakeyama et al. | |
| 7,106,526 B2 | 9/2006 | Tomita et al. | |
| 2002/0008854 A1 * | 1/2002 | Leigh Travis | 353/69 |
| 2002/0027720 A1 * | 3/2002 | Nishikawa et al. | 359/678 |
| 2003/0035232 A1 * | 2/2003 | Sasaki | 359/859 |
| 2004/0223126 A1 * | 11/2004 | Hatakeyama et al. | 353/122 |
| 2004/0263989 A1 * | 12/2004 | Cobb et al. | 359/634 |
| 2005/0024720 A1 * | 2/2005 | Cartlidge et al. | 359/368 |
| 2005/0243439 A1 | 11/2005 | Tomita et al. | |

FOREIGN PATENT DOCUMENTS

| | | |
|---|---|---|
| GB | 2360603 A | 9/2001 |
| JP | 2173712 | 12/1986 |
| JP | 1128024 | 11/1987 |
| JP | 4159505 | 9/1990 |
| WO | WO0229772 A2 | 4/2002 |
| WO | WO0243381 A1 | 5/2002 |
| WO | WO0206187 A1 | 8/2002 |
| WO | 2004109380 A1 | 12/2004 |
| WO | 20040109380 A | 12/2004 |
| WO | 2005124427 A1 | 12/2005 |

OTHER PUBLICATIONS

Chen, C.H., New projection lens for three-dimensional displays, IEEE Electronics Letters, Publication Date: Nov. 25, 1999, vol. 35, No. 24, pp. 2137-2138.

CAM FPD, Wedge Optics, http://www.camfpd.com/tech21.htm, printed Oct. 11, 2005, Copyright 1999-2005 Cambridge Flat Projection Displays Ltd.

Travis, Adrian, et al., "P-127: Linearity in Flat Panel Wedge Projection", Society for Information Display, 2003 International Symposium, ID 03 Digest, XP-002414190, ISSN/0003-0966X/03/3401-0716, 2003.

* cited by examiner

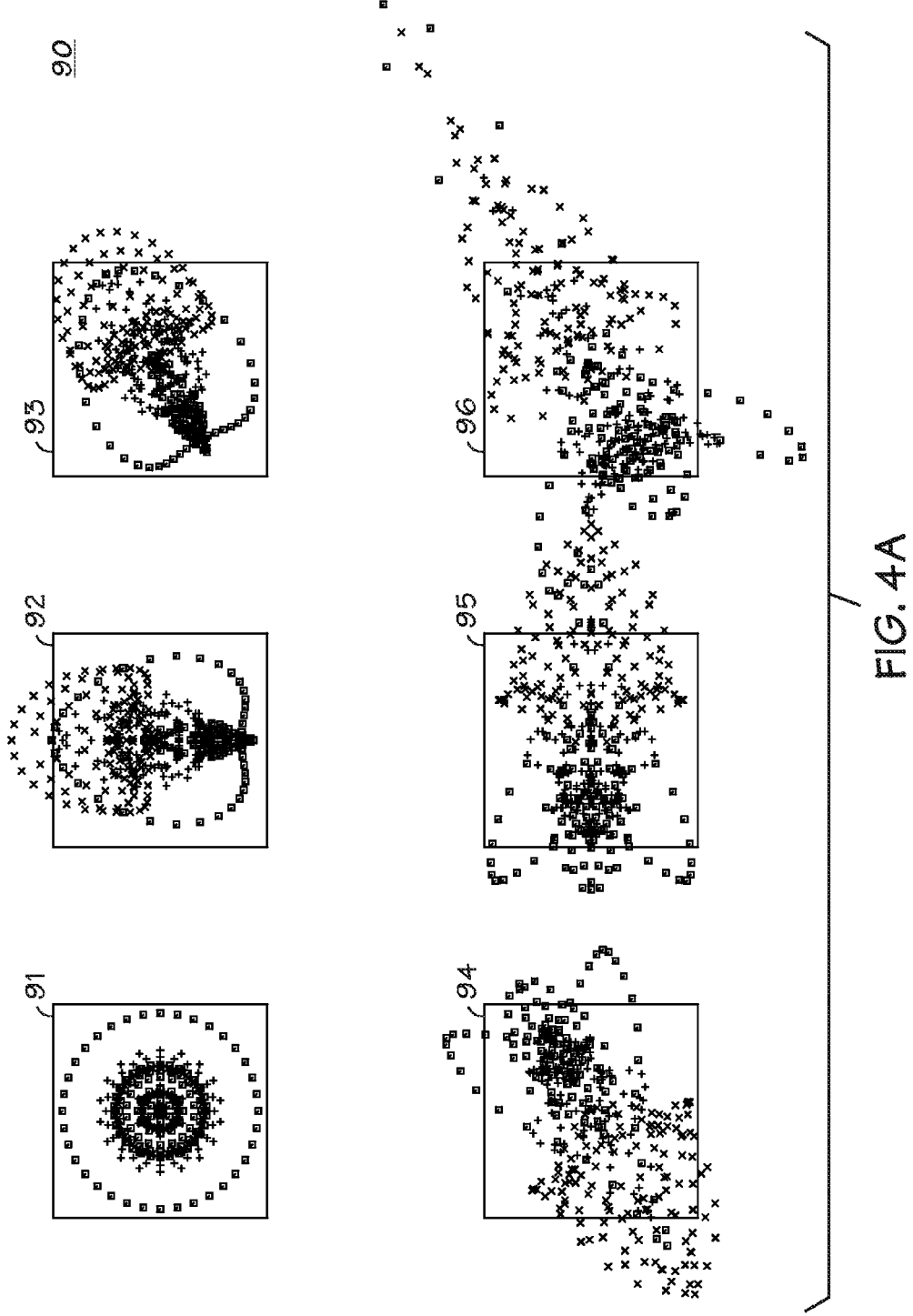

PROJECTION LENS SYSTEM AND METHOD

CROSS-REFERENCE TO RELATED APPLICATIONS

This application is a National Phase 371 Application of PCT Application No. PCT/US06/12466, filed Mar. 31, 2006, entitled "Projection Lens System and Method".

FIELD OF THE INVENTION

The present invention relates generally to projection lens systems for video display. More specifically, the present invention relates to a system and method for medium-wide-angle projection.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Projection systems employed in video display units typically utilize lenses adapted to disperse light in a wide cone. The wide cone of light is usually projected on a screen disposed relatively far away form the projection system. As one of ordinary skill in the art would appreciate, such lenses typically have a structure by which chief light rays are made roughly parallel towards the front of the lens of the projection system. This is usually achieved by embedding an exit pupil deep within the lens, adapting the light rays to be parallel and attain a "wide waist." In order to further widen the light beam, negative lens elements are disposed subsequent to the parallel rays, thus increasing their divergence.

Although wide-angle projection is common, there are video systems for which the use of wide-angle projection system may not be an optimal choice. In systems such as wedge displays comprising a screen in the form of a wedge, light exiting the projection lens system may be inserted into a small entrance aperture of the wedge display. The light entering the wedge display may be projected at an angle relative to the wedge display, such that the light undergoes multiple total internal reflections as it propagates through the wedge to form an image. In this manner an image can be formed on a screen having a relatively small width. Consequently, due to the small entrance pupil and the manner in which the image is projected thereon, the use of a wide-angle projection system may be incompatible with a use of display device, such as a wedge display. Such incompatibility stems from the large beam size produced by a wide-angle projection system and the small entrance pupil of the display device. This mismatch can cause a general loss of light-coupling efficiency between the display device and the projection system. Ultimately this may degrade the quality of the image displayed on a display device. A system and method that allows the use of wide-angle projection in such circumstances is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the disclosed invention relate to a video unit, comprising an imaging system configured to create an image, at least one lens configured to produce a medium wide-angle representation of the image, and an aperture stop positioned to capture the medium wide-angle representation of the image from the at least one lens.

BRIEF DESCRIPTION OF THE DRAWINGS

Advantages of the invention may become apparent upon reading the following detailed description and upon reference to the drawings in which:

FIG. 4A is a depiction of various spot diagrams in accordance with an exemplary embodiment of the present invention;

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
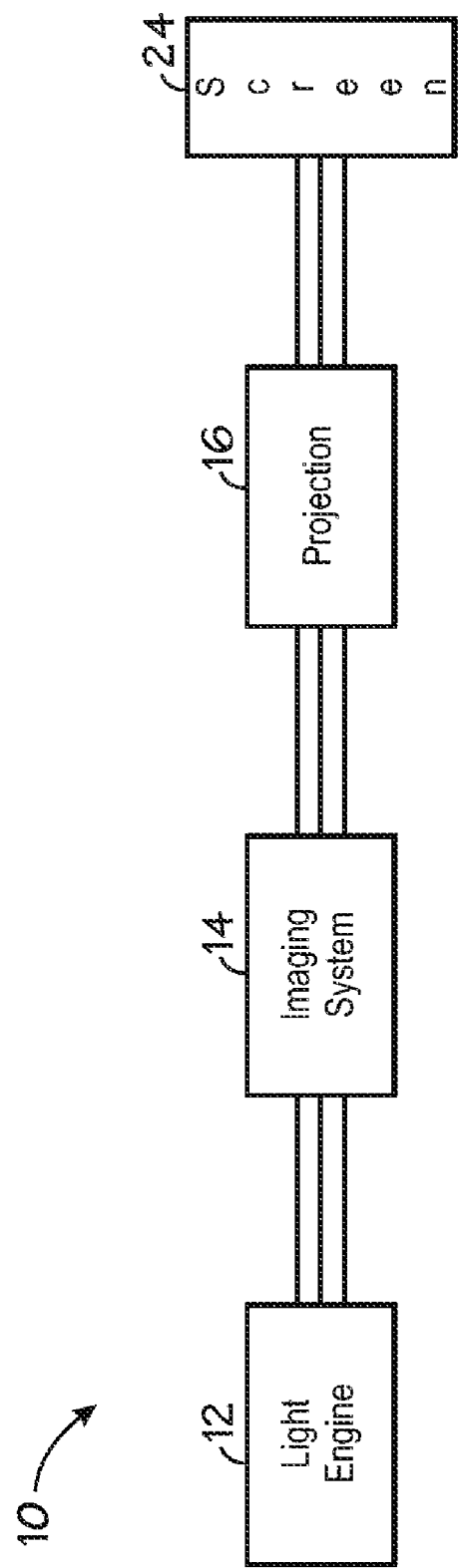
FIG. 1 is a block diagram of a video unit in accordance with an exemplary embodiment of the present invention.

Turning initially to FIG. 1, a block diagram of a video unit in accordance with an exemplary embodiment of the present invention is illustrated and generally designated by a reference numeral 10. The video unit 10 may comprise a Digital Light Processing ("DLP") projection television or projector. In another embodiment, the video unit 10 may comprise a liquid crystal display ("LCD") projection television or projector. In still other embodiments, the video unit 10 may comprise another suitable form of projection television or display.

The video unit 10 may include a light engine 12. The light engine 12 is configured to generate white or colored light that can be employed by an imaging system 14 to create a video image. The light engine 12 may include any suitable form of lamp or bulb capable of projecting white or generally white light. In one embodiment, the light engine 12 may be a high intensity light source, such as a metal halide lamp or a mercury vapor lamp. For example, the light engine 12 may include an ultra high performance ("UHP") lamp produced by Philips Electronics. The light engine 12 may also include a component configured to convert the projected white light into colored light, such as color wheels, dichroic mirrors, polarizers, and filters. Moreover, in alternate embodiments, the light engine 12 may include components capable of generating color light, such as light emitting diodes.

As described above, the light engine 12 may be configured to project, shine, or focus colored light at the imaging system 14. The imaging system 14 may be configured to employ the colored light to create images suitable for display on a screen 24. The imaging system 14 may be configured to generate one or more pixel patterns that can be used to calibrate pixel shifting in the video unit 10. In one embodiment, the imaging system 14 comprises a DLP imaging system that employs one or more DMDs to generate a video image using the colored light. In another embodiment, the imaging system may employ an LCD projection system. It will be appreciated, however, that the above-described exemplary embodiments are not intended to be exclusive, and that in alternate embodiments, any suitable form of imaging system 14 may be employed in the video unit 10.

As illustrated in FIG. 1, the imaging system 14 may be configured to project images into a medium wide-angle projection lens assembly 16, identified as "projection" in FIG. 1. As described further below, the medium wide-angle projection lens assembly 16 may include one or more lenses and/or mirrors that project the image created by the imaging system 14 onto the screen 24. The display screen 24 may comprise a wedge display device configured to receive light from the projection system 16. The light entering the wedge display 24 enters at an angle, such that it undergoes total internal reflection on the side the wedge until a critical angle between the wedge and the light therein is obtained. Once this occurs, an image is formed on a side of the wedge, viewable to a user.

Figure 2:
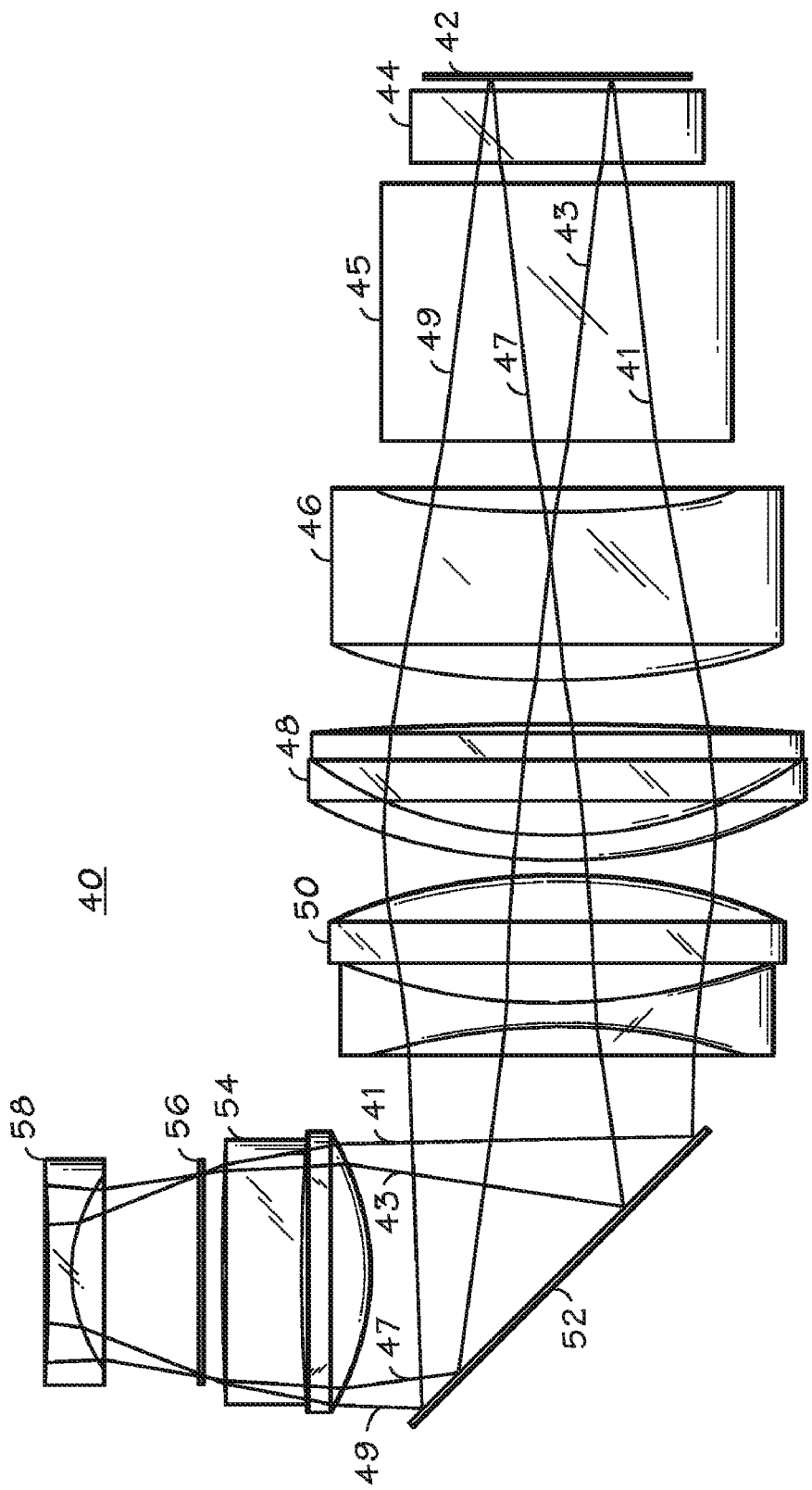
FIG. 2 is a diagram of a projection lens system in accordance with an exemplary embodiment of the present invention.

FIG. 2 is a diagram of a projection lens system in accordance with an exemplary embodiment of the present invention, generally designated by reference numeral 40. The system 40 illustrated in FIG. 2 is adapted to produce medium-wide-angle projection of light. Such a projection system adapts light components exiting the projection lens assembly 40 to optimally enter a small entrance pupil, such as the one provided by wedge display 24. Accordingly, FIG. 2 depicts imaging device 42, such as a DMD, and its cover glass 44 disposed at one end of the assembly 40. The DMD 42 generates light components that are further processed for medium-wide-angle projection via lens elements comprising the system 40. Thus, in this exemplary embodiment, the DMD 42 provides a plane from which exemplary chief light rays 41, 43, 47, and 49 originate in the lens assembly 40. Although only four exemplary light rays are shown in FIG. 2, it should be appreciated by those skilled in the art that in actuality a bundle of light rays emanates from the DMD 42.

The system 40 further includes a total internal reflection (TIR) prism 45, disposed adjacent to the cover glass 44. Colored light components comprising red, green, and blue (RGB) are emitted by the DMD 42 and projected through the TIR prism 45. In addition to the colored light components, image illumination light components (not shown) are also entering the TIR prism 45 enroute to the DMD 42 as well. The purpose of the TIR prism 45 is to direct these two different light bundles to their respective destinations. That is, the illumination light is directed to the DMD 42 and the colored light components are directed into first lens element 46. Accordingly, the TIR 45 is adapted to separate between the image RGB and illumination components.

The light rays exiting the TIR prisms 45 are next projected onto an acrylic aspherical lens 46. The purpose of the lens 46 is to fine tune the rays exiting from the TIR prism 45, which at this point may become somewhat divergent. Accordingly, the light rays 41, 43, 47 and 49 are next projected onto a doublet lens 48, disposed next to the aspherical lens 46. The lens 48 initially focuses the diverging light. Thereafter, the light rays are projected onto lens 50 disposed adjacent to the compound doublet lens 48. The lens 50 further "squeezes" the light emerging from the lens 48, as depicted by the light rays 41, 43, 47, and 49.

A plane mirror 52 disposed adjacent to the lens 50 is used to fold the light, so as to make the lens assembly 40 more compact. Accordingly, the mirror 52 is disposed at a forty five-degree angle relative to the horizontal and vertical components of the lens assembly 40. In this configuration, the mirror 52 reflects the image, causing it to propagate in a vertical direction. Absent the mirror 52, light rays emerging from the lens 50 would continue to propagate along a horizontal path, extending the length of the projection lens system 40. Further, the mirror 52 may be adapted to wiggle synchronously with micro-mirrors comprising the imaging device, such as the one employed in the DMD 42. The synchronous wiggling between the mirror 52 and the micro-mirrors of the display device optimizes the projection of an image generated by the DMD 42 onto an aperture stop 56.

Light reflected from mirror 52 is projected onto a focusing lens 54 disposed between the mirror 52 and the aperture stop 56. The light entering into lens 54 is focused just prior to its propagation through the aperture stop 56. As appreciated by those skilled in the, an aperture stop determines an exit pupil of a lens. As illustrated by FIG. 2, the exemplary embodiment of the present technique places the exit pupil of the light far forward in the lens system 40. By doing so, a "smallest waist" of the ray bundle will occur at the entrance pupil of the display screen 24 (FIG. 1). Hence, providing the "smallest waist" of the ray bundle to the display device 24, maximizes the light coupling efficiency between the projection system 16 (FIG. 1) and the display device 24.

Figure 3:
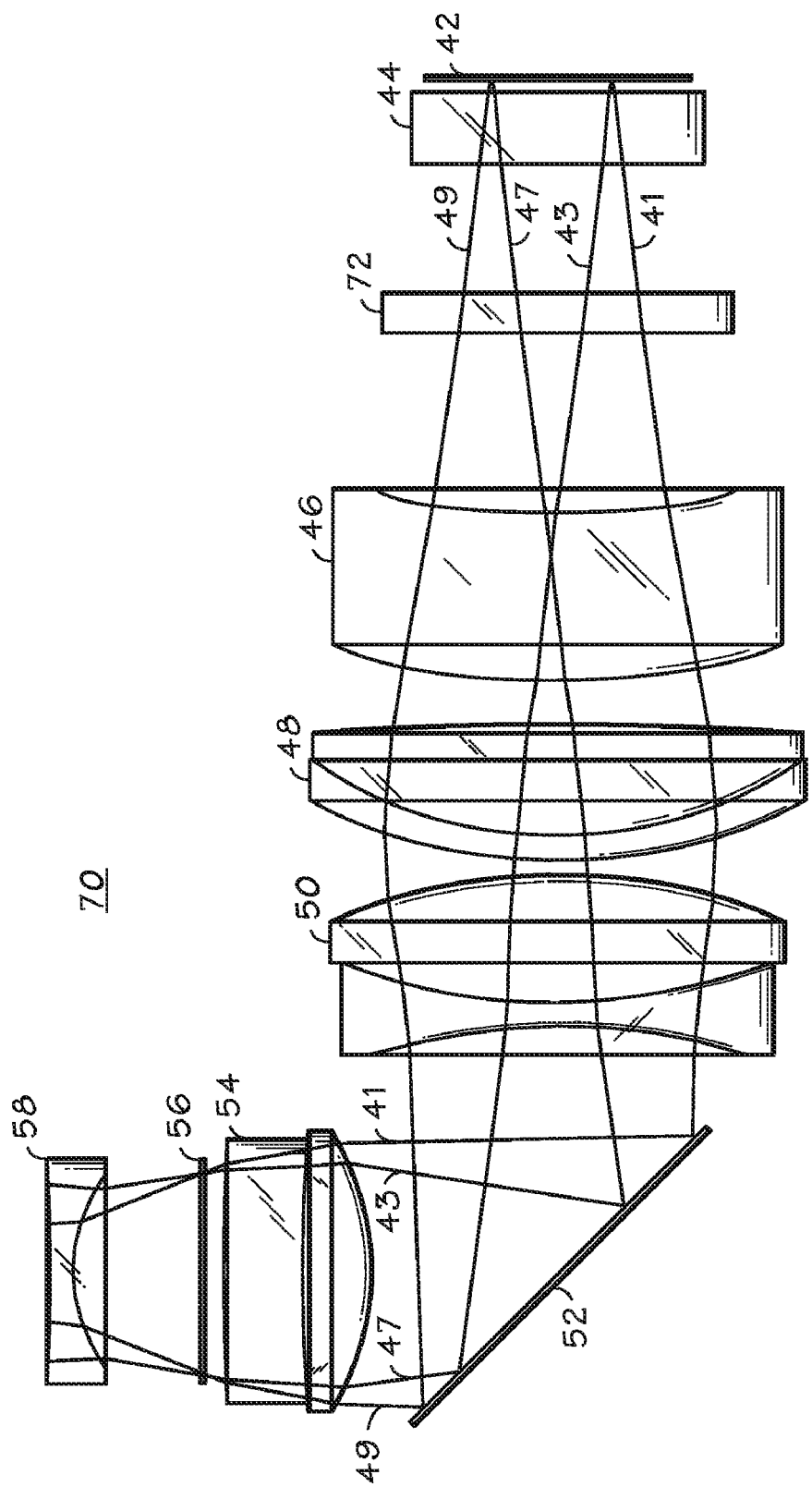
FIG. 3 is a diagram of a projection lens system in accordance with an exemplary embodiment of the present invention.

FIG. 3 is a diagram of a projection lens system in accordance with an exemplary embodiment of the present invention, generally designated by reference numeral 70. The system 70 is similar both in structure and in composition to the lens system 40 shown in FIG. 1. However, the system 70 comprises a field lens 72 rather than a TIR prism 45 shown in FIG. 2. The field lens 72 effectively functions like the TIR prism 45, while providing better illumination for the projected image. By employing the field lens 72, the system 70 is more efficient in producing a brighter image on the display device 24.

Lens elements subsequent to the field lens 72 shown in FIG. 3 function in a similar manner to the lens elements adjacent to the TIR prism 45 of the system 40 shown in FIG. 2. In both the system 40 and the system 70, the aperture stop 56 is placed far forward in the lens, providing a "smallest waist" of the ray bundle to occur at the entrance pupil of the display screen 24.

Placing the aperture stop far forward in the lens, as achieved in the projection lenses 40 and 70 produces an optimal modulation transfer function (MTF) performance rather than a smallest root mean square (RMS) spot size. Accordingly, FIG. 4A illustrates a collection of spot diagrams 90 produced by the system 40 in accordance with an exemplary embodiment of the present invention. These diagrams depict six fields 91-96, each having a unique RMS and geometrical (GEO) radius for a box width of 12 micrometers. The fields depict an image of a pixel disposed on the DMD 42. The data of the spot diagrams 90 is summarized in Table 1 below, where all units are in micrometers:

TABLE 1

| | \multicolumn{6}{c|}{Field} |
| | 91 | 92 | 93 | 94 | 95 | 96 |
|---|---|---|---|---|---|---|
| RMS Radius | 2.579 | 3.548 | 3.586 | 5.052 | 5.186 | 6.718 |
| Geo Radius | 5.497 | 8.346 | 8.468 | 11.825 | 12.145 | 23.584 |

Figure 4B:
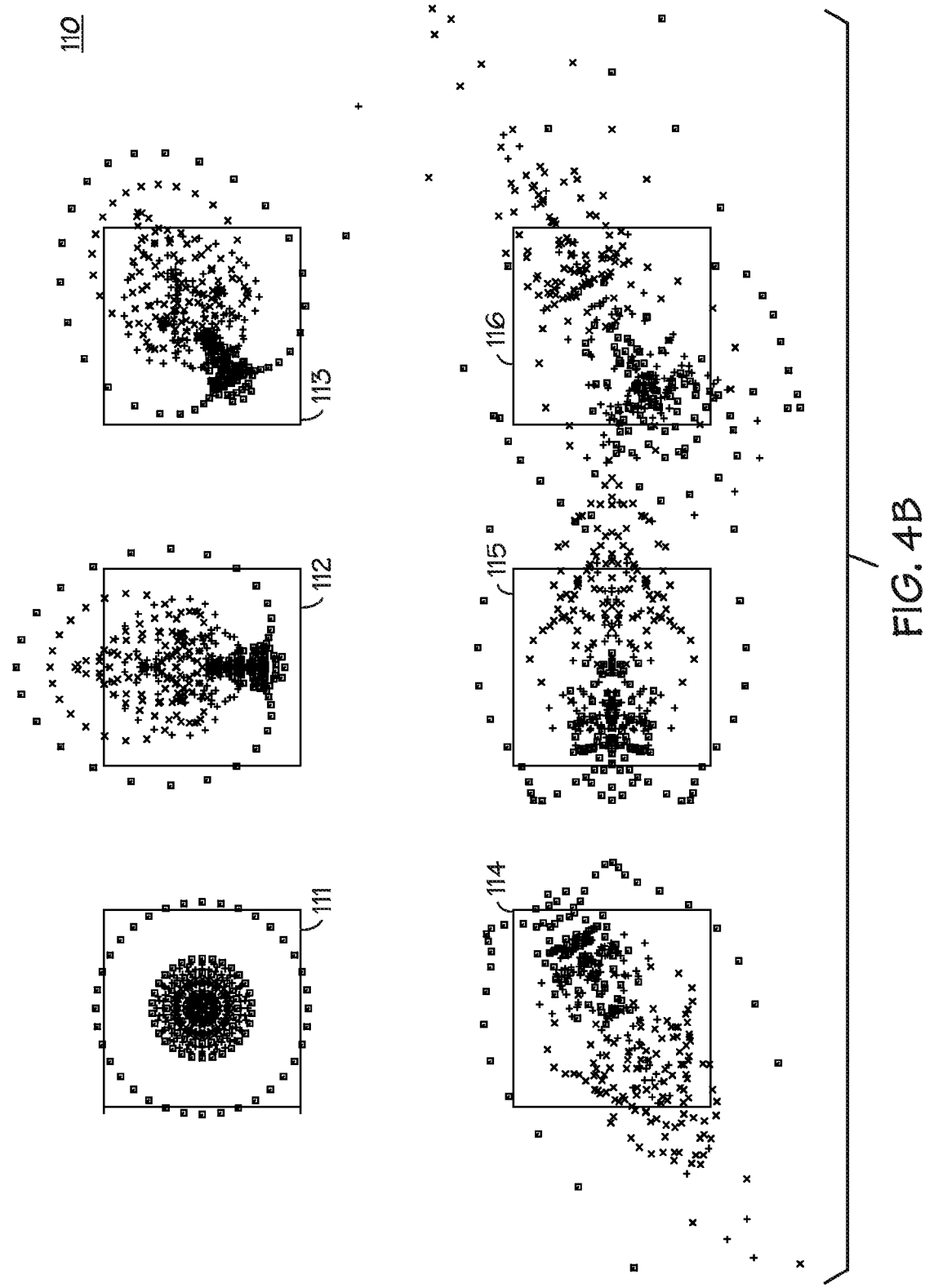
FIG. 4B is a depiction of additional spot diagrams in accordance with an exemplary embodiment of the present invention.

Similarly, FIG. 4B depicts a collection of spot diagrams 110 produced by the projection lens system 70 in accordance with embodiments of the present technique. These diagrams depict six fields 111-116, each having a unique RMS and a GEO radius for a box width of 12 micrometers. The fields depict the image of a pixel disposed on the DMD 42. The data of the spot diagrams 110 is summarized in Table 2 below, where all units are in micrometers:

TABLE 2

| | \multicolumn{6}{c|}{Field} |
| | 111 | 112 | 113 | 114 | 115 | 116 |
|---|---|---|---|---|---|---|
| RMS Radius | 2.665 | 4.013 | 4.062 | 6.798 | 7.433 | 18.014 |
| Geo Radius | 6.490 | 11.339 | 11.495 | 30.905 | 36.344 | 112.455 |

Further, the system 40 has a modulation transfer function (MTF), which yields a value of 40%, considered as a worst case when evaluated at a spatial frequency of 45 lines per millimeter. In the case of the system 70, the MTF yields a value of 44%, considered as a worst case when evaluated at a spatial frequency of 45 lines per millimeter.

Furthermore, an exemplary embodiment of the system 40 produces a grid distortion of 0.165%, while an exemplary embodiment of the system 70 produces a grid distortion of 0.105%. Similarly, the systems 40 and 70 produce a 22% center to corner light fall-off across a screen. Accordingly, display units employing projection lens system, such as exemplary embodiments of the systems 40 and 70, may considerably out-perform display units employing cathode ray tubes (CRTs). CRT systems typically possess a 70% center to corner light fall-off across a screen, as may be appreciated to those of ordinary skill in the art.

Figure 5:
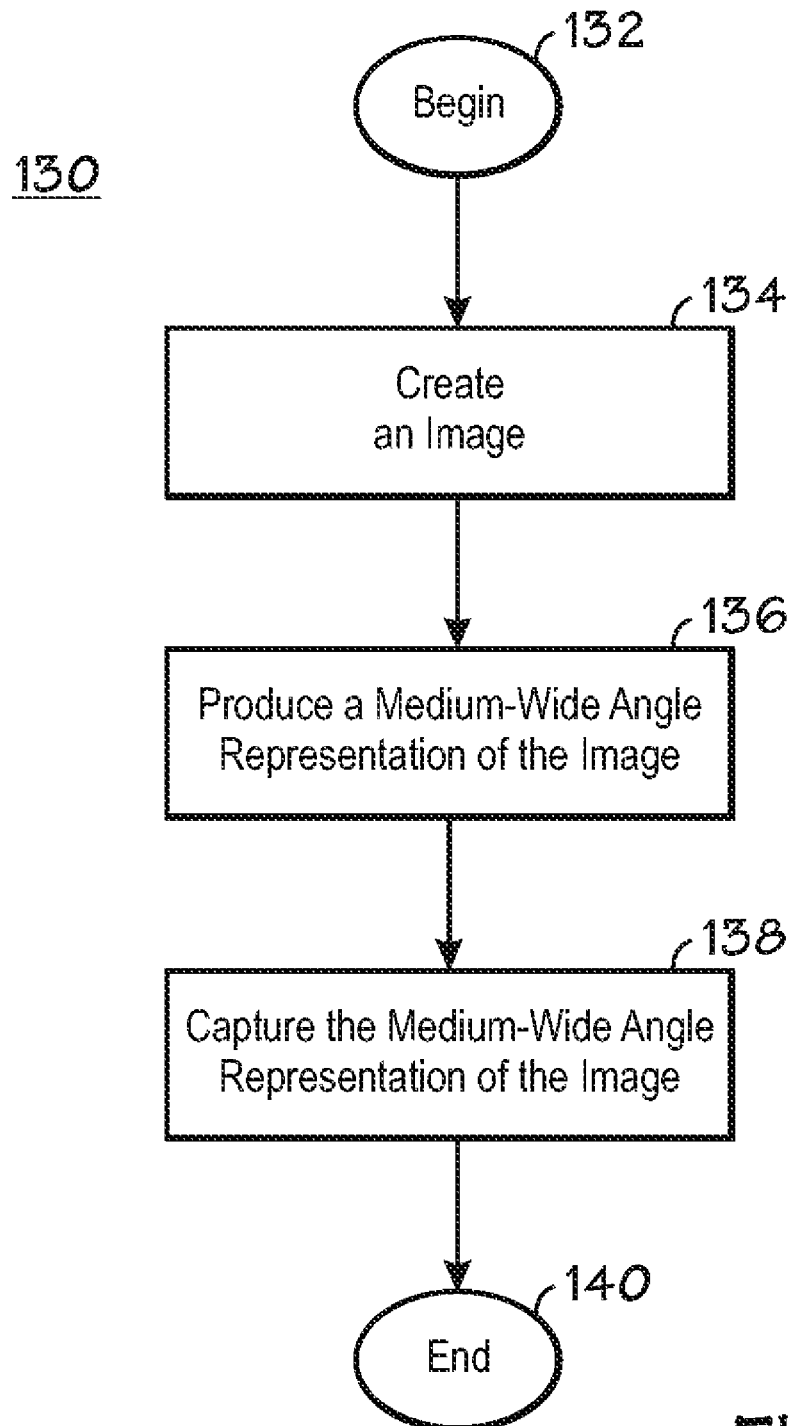
FIG. 5 is a flow chart that shows a method in accordance with an exemplary embodiment of the present invention.

Turning now to FIG. 5, a flow chart in accordance with an exemplary embodiment of the present invention is depicted, and is generally designated by the reference numeral 130. The flow chart 130 describes a method for capturing a medium-wide-angle representation of an image. Such a method may be employed via the lens assemblies 40 and 70 respectively shown by FIGS. 2 and 3. The method begins a block 132. At block 134, the imaging device generates an image. Thereafter, at block 136 the image is delivered to a projection system, which produces a medium-wide-angle representation of the image. This may be achieved by placing the aperture stop far forward within the lens assembly comprising the projection system. At block 138, the medium-wide-angle representation of the image may be effectively coupled and captured by a display device. The method ends at block 140.

An example of computer code useful for designing an exemplary embodiment of the present invention is given below:

General Lens Data:

| | |
|---|---|
| Surfaces | 22 |
| Stop | 3 |
| System Aperture | Float By Stop Size = 4.29 |
| Glass Catalogs | SCHOTT MISC HIKARI CORNING |
| Ray Aiming | Paraxial Reference, Cache On |
| X Pupil shift | 2 |
| Y Pupil shift | 2 |
| Z Pupil shift | 2 |
| Apodization | Uniform, factor = 0.00000E+000 |
| Effective Focal Length | 15.38915 (in air at system temperature and pressure) |
| Effective Focal Length | 15.38915 (in image space) |
| Back Focal Length | 0.6692284 |
| Total Track | 50.06067 |
| Image Space F/# | 2.598209 |
| Paraxial Working F/# | 2.595522 |
| Working F/# | 2.65 |
| Image Space NA | 0.1891616 |
| Object Space NA | 0.001968192 |
| Stop Radius | 4.29 |
| Paraxial Image Height | 5.619357 |
| Paraxial Magnification | −0.01021699 |
| Entrance Pupil Diameter | 5.922984 |
| Entrance Pupil Position | 4.673129 |
| Exit Pupil Diameter | 58.50706 |
| Exit Pupil Position | −151.8274 |
| Field Type | Object height in Millimeters |
| Maximum Radial Field | 550.0012 |
| Primary Wavelength | 0.55 μm |
| Lens Units | Millimeters |
| Angular Magnification | 0.1012451 |

Surface Data Summary:

| Surf | Type | Comment | Radius | Thickness | Glass | Diameter | Conic |
|---|---|---|---|---|---|---|---|
| OBJ | TILTSURF | SCREEN | — | 1500 | | 1100.002 | — |
| 1 | EVENASPH | LENS 8 STOP | −134.8474 | 1 | ACRYLIC | 9.466651 | 739.4691 |
| 2 | EVENASPH | LENS 8 START | 10.24597 | 5.816177 | | 8.486183 | 1.335873 |
| STO | STANDARD | STOP | Infinity | 0.4999999 | | 8.58 | 0 |
| 4 | STANDARD | LENS 7 STOP | 78.53505 | 3.454109 | N-LAF7 | 9.428377 | 0 |
| 5 | STANDARD | LENS 7 START | 194.8518 | 2.779957 | ZK1 | 11.11542 | 0 |
| 6 | STANDARD | LENS 6 START | −10.98162 | 7.75 | | 11.74055 | 0 |
| 7 | COORDBRK | | — | 0 | | — | — |
| 8 | STANDARD | | Infinity | 0 | MIRROR | 17.79251 | 0 |
| 9 | COORDBRK | | — | −10.29258 | | — | — |
| 10 | STANDARD | LENS 5 STOP | 28.30512 | −0.9999996 | SFL4 | 16.47256 | 0 |
| 11 | STANDARD | LENS 5 START | −25.22335 | −5.409959 | SK14 | 17.99469 | 0 |
| 12 | STANDARD | LENS 4 START | 24.70861 | −0.5662337 | | 19.04373 | 0 |
| 13 | STANDARD | LENS 3 STOP | −22.75477 | −1.000003 | BALF4 | 20.74188 | 0 |
| 14 | STANDARD | LENS 3 START | −17.69436 | −4.732311 | SK4 | 20.46932 | 0 |
| 15 | STANDARD | LENS 2 START | 148.3144 | −1.85357 | | 20.23533 | 0 |
| 16 | EVENASPH | LENS 1 STOP | −55.05112 | −7.061342 | ACRYLIC | 18.84346 | 19.73865 |
| 17 | EVENASPH | LENS 1 START | 48.52976 | −3 | | 15.28996 | 69.94862 |
| 18 | STANDARD | QUAD STOP | Infinity | −10.81067 | BK7 | 14.65756 | 0 |

-continued

| Surf | Type | Comment | Radius | Thickness | Glass | Diameter | Conic |
|---|---|---|---|---|---|---|---|
| 19 | STANDARD | QUAD START | Infinity | −0.851 | | 14.65756 | 0 |
| 20 | STANDARD | | Infinity | −3 | A87-70 | 12.20853 | 0 |
| 21 | STANDARD | | Infinity | −0.483 | | 11.58993 | 0 |
| IMA | STANDARD | IMAGER | Infinity | | | 11.24418 | 0 |

Surface Data Detail:

| | |
|---|---|
| Surface OBJ | TILTSURF SCREEN |
| X Tangent | 0 |
| Y Tangent | 0 |
| Aperture | Rectangular Aperture |
| X Half Width | 479.37 |
| Y Half Width | 269.64 |
| Surface 1 | EVENASPH LENS 8 STOP |
| Coeff on r 2 | 0 |
| Coeff on r 4 | −0.00011728082 |
| Coeff on r 6 | −7.7981108e−006 |
| Coeff on r 8 | 3.5157708e−007 |
| Coeff on r 10 | 0 |
| Coeff on r 12 | 0 |
| Coeff on r 14 | 0 |
| Coeff on r 16 | 0 |
| Surface 2 | EVENASPH LENS 8 START |
| Coeff on r 2 | 0.025016615 |
| Coeff on r 4 | −4.6538705e−005 |
| Coeff on r 6 | −1.6885864e−005 |
| Coeff on r 8 | 4.9040087e−007 |
| Coeff on r 10 | 0 |
| Coeff on r 12 | 0 |
| Coeff on r 14 | 0 |
| Coeff on r 16 | 0 |
| Surface STO | STANDARD STOP |
| Surface 4 | STANDARD LENS 7 STOP |
| Aperture | Floating Aperture |
| Maximum Radius | 4.714189 |
| Surface 5 | STANDARD LENS 7 START |
| Aperture | Floating Aperture |
| Maximum Radius | 5.557712 |
| Surface 6 | STANDARD LENS 6 START |
| Surface 7 | COORDBRK |
| Decenter X | 0 |
| Decenter Y | 0 |
| Tilt About X | 45 |
| Tilt About Y | 0 |
| Tilt About Z | 0 |
| Order | Decenter then tilt |
| Surface 8 | STANDARD |
| Mirror Substrate | Curved, Thickness = 3.55850E−001 |
| Surface 9 | COORDBRK |
| Decenter X | 0 |
| Decenter Y | 0 |
| Tilt About X | 45 |
| Tilt About Y | 0 |
| Tilt About Z | 0 |
| Order | Decenter then tilt |
| Surface 10 | STANDARD LENS 5 STOP |
| Surface 11 | STANDARD LENS 5 START |
| Surface 12 | STANDARD LENS 4 START |
| Surface 13 | STANDARD LENS 3 STOP |
| Surface 14 | STANDARD LENS 3 START |
| Surface 15 | STANDARD LENS 2 START |
| Surface 16 | EVENASPH LENS 1 STOP |
| Coeff on r 2 | 0 |
| Coeff on r 4 | −7.9580475e−005 |
| Coeff on r 6 | −4.2333061e−008 |
| Coeff on r 8 | 2.1566488e−009 |
| Coeff on r 10 | 0 |
| Coeff on r 12 | 0 |
| Coeff on r 14 | 0 |
| Coeff on r 16 | 0 |
| Surface 17 | EVENASPH LENS 1 START |
| Coeff on r 2 | −0.011733351 |
| Coeff on r 4 | −0.00016478422 |

-continued

| | |
|---|---|
| Coeff on r 6 | −1.4517046e−006 |
| Coeff on r 8 | 4.7147566e−009 |
| Coeff on r 10 | 0 |
| Coeff on r 12 | 0 |
| Coeff on r 14 | 0 |
| Coeff on r 16 | 0 |
| Aperture | Floating Aperture |
| Maximum Radius | 7.644982 |
| Surface 18 | STANDARD QUAD STOP |
| Surface 19 | STANDARD QUAD START |
| Aperture | Floating Aperture |
| Maximum Radius | 7.32878 |
| Surface 20 | STANDARD |
| Surface 21 | STANDARD |
| Surface IMA | STANDARD IMAGER. |

A further example of computer code useful for designing an exemplary embodiment of the present invention is given below:

General Lens Data:

| | |
|---|---|
| Surfaces | 22 |
| Stop | 3 |
| System Aperture | Float By Stop Size = 4.29 |
| Glass Catalogs | SCHOTT MISC HIKARI CORNING |
| Ray Aiming | Paraxial Reference, Cache On |
| X Pupil shift | 2 |
| Y Pupil shift | 2 |
| Z Pupil shift | 2 |
| Apodization | Uniform, factor = 0.00000E+000 |
| Effective Focal Length | 15.4126 (in air at system temperature and pressure) |
| Effective Focal Length | 15.4126 (in image space) |
| Back Focal Length | 0.6401503 |
| Total Track | 48.67506 |
| Image Space F/# | 2.605767 |
| Paraxial Working F/# | 2.600509 |
| Working F/# | 2.65 |
| Image Space NA | 0.1888118 |
| Object Space NA | 0.001965507 |
| Stop Radius | 4.29 |
| Paraxial Image Height | 5.622473 |
| Paraxial Magnification | −0.01022266 |
| Entrance Pupil Diameter | 5.914804 |
| Entrance Pupil Position | 4.648139 |
| Exit Pupil Diameter | 29.96748 |
| Exit Pupil Position | −77.93111 |
| Field Type | Object height in Millimeters |
| Maximum Radial Field | 550.0012 |
| Primary Wavelength | 0.55 μm |
| Lens Units | Millimeters |
| Angular Magnification | 0.1973838 |

Surface Data Summary:

| Surf | Type | Comment | Radius | Thickness | Glass | Diameter | Conic |
|---|---|---|---|---|---|---|---|
| OBJ | TILTSURF | SCREEN | — | 1500 | | 1100.002 | — |
| 1 | EVENASPH | LENS 8 STOP | −104.842 | 1 | ACRYLIC | 9.521499 | 383.9438 |
| 2 | EVENASPH | LENS 8 START | 10.36649 | 5.792611 | | 8.538207 | 1.503846 |
| STO | STANDARD | STOP | Infinity | 0.4999929 | | 8.58 | 0 |
| 4 | STANDARD | LENS 7 STOP | 106.2389 | 4.973123 | LAF11A | 9.390868 | 0 |
| 5 | STANDARD | LENS 7 START | 542.1024 | 2.901663 | ZK1 | 11.90141 | 0 |
| 6 | STANDARD | LENS 6 START | −11.45982 | 7.75 | | 12.54491 | 0 |
| 7 | COORDBRK | | — | 0 | | — | — |
| 8 | STANDARD | | Infinity | 0 | MIRROR | 18.96099 | 0 |
| 9 | COORDBRK | | — | −10.29258 | | — | — |
| 10 | STANDARD | LENS 5 STOP | 30.20158 | −0.9999954 | SFL4 | 17.34614 | 0 |
| 11 | STANDARD | LENS 5 START | −28.39295 | −4.559673 | SK14 | 18.85949 | 0 |
| 12 | STANDARD | LENS 4 START | 25.25265 | −0.4999976 | | 19.45177 | 0 |
| 13 | STANDARD | LENS 3 STOP | −22.41238 | −1.000002 | BALF4 | 21.11171 | 0 |
| 14 | STANDARD | LENS 3 START | −15.77587 | −5.231067 | SK4 | 20.71645 | 0 |
| 15 | STANDARD | LENS 2 START | 148.006 | −3.673802 | | 20.46509 | 0 |
| 16 | EVENASPH | LENS 1 STOP | −67.85487 | −7.383939 | ACRYLIC | 18.28601 | 30.04269 |
| 17 | EVENASPH | LENS 1 START | 113.0542 | −9 | | 14.73889 | −580.4284 |
| 18 | STANDARD | | −89 | −1.7 | KZFSN5 | 13.01439 | 0 |
| 19 | STANDARD | | 130 | −0.851 | | 12.76845 | 0 |
| 20 | STANDARD | | Infinity | −3 | A87-70 | 12.39065 | 0 |
| 21 | STANDARD | | Infinity | −0.483 | | 11.63593 | 0 |
| IMA | STANDARD | IMAGER | Infinity | | | 11.24363 | 0 |

Surface Data Detail:

| | |
|---|---|
| Surface OBJ | TILTSURF SCREEN |
| X Tangent | 0 |
| Y Tangent | 0 |
| Aperture | Rectangular Aperture |
| X Half Width | 479.37 |
| Y Half Width | 269.64 |
| Surface 1 | EVENASPH LENS 8 STOP |
| Coeff on r 2 | 0 |
| Coeff on r 4 | −0.00014594555 |
| Coeff on r 6 | −2.7646741e−006 |
| Coeff on r 8 | 1.8122862e−007 |
| Coeff on r 10 | 0 |
| Coeff on r 12 | 0 |
| Coeff on r 14 | 0 |
| Coeff on r 16 | 0 |
| Surface 2 | EVENASPH LENS 8 START |
| Coeff on r 2 | 0.025016615 |
| Coeff on r 4 | −0.00014165702 |
| Coeff on r 6 | −8.9658626e−006 |
| Coeff on r 8 | 1.8040403e−007 |
| Coeff on r 10 | 0 |
| Coeff on r 12 | 0 |
| Coeff on r 14 | 0 |
| Coeff on r 16 | 0 |
| Surface STO | STANDARD STOP |
| Surface 4 | STANDARD LENS 7 STOP |
| Aperture | Floating Aperture |
| Maximum Radius | 4.695434 |
| Surface 5 | STANDARD LENS 7 START |
| Aperture | Floating Aperture |
| Maximum Radius | 5.950707 |
| Surface 6 | STANDARD LENS 6 START |
| Surface 7 | COORDBRK |
| Decenter X | 0 |
| Decenter Y | 0 |
| Tilt About X | 45 |
| Tilt About Y | 0 |
| Tilt About Z | 0 |
| Order | Decenter then tilt |
| Surface 8 | STANDARD |
| Mirror Substrate | Curved, Thickness = 3.79220E−001 |
| Surface 9 | COORDBRK |
| Decenter X | 0 |
| Decenter Y | 0 |
| Tilt About X | 45 |
| Tilt About Y | 0 |
| Tilt About Z | 0 |
| Order | Decenter then tilt |
| Surface 10 | STANDARD LENS 5 STOP |
| Surface 11 | STANDARD LENS 5 START |
| Surface 12 | STANDARD LENS 4 START |
| Surface 13 | STANDARD LENS 3 STOP |
| Surface 14 | STANDARD LENS 3 START |
| Surface 15 | STANDARD LENS 2 START |
| Surface 16 | EVENASPH LENS 1 STOP |
| Coeff on r 2 | 0 |
| Coeff on r 4 | −7.0768702e−005 |
| Coeff on r 6 | 1.7941983e−007 |
| Coeff on r 8 | 1.7441529e−009 |
| Coeff on r 10 | 0 |
| Coeff on r 12 | 0 |
| Coeff on r 14 | 0 |
| Coeff on r 16 | 0 |
| Surface 17 | EVENASPH LENS 1 START |
| Coeff on r 2 | −0.011733351 |
| Coeff on r 4 | −0.00019775485 |
| Coeff on r 6 | −1.110827e−006 |
| Coeff on r 8 | 6.3383452e−009 |
| Coeff on r 10 | 0 |
| Coeff on r 12 | 0 |
| Coeff on r 14 | 0 |
| Coeff on r 16 | 0 |
| Aperture | Floating Aperture |
| Maximum Radius | 7.369445 |
| Surface 18 | STANDARD |
| Surface 19 | STANDARD |
| Surface 20 | STANDARD |
| Surface 21 | STANDARD |
| Surface IMA | STANDARD IMAGER |

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A video unit, comprising:
an image creation system configured to create an image;
a lens assembly configured to produce a meduim wide-angle projection of the image, wherein the lens assembly comprises:
   a separation lens configured to receive light rays relating to the image from the image creation system, to separate illumination components of the light rays from colored light components of the light rays, and to direct the illumination components of the light rays back to the image creation system;
   an aspherical lens disposed adjacent to the separation lens and configured to cause the light rays from the separation lens to diverge;
   a compound doublet lens disposed adjacent to the aspherical lens and configured to focus the light rays from the aspherical lens;
   a converging lens disposed adjacent to the compound doublet lens and configured to cause the light rays from the compound doublet lens to converge;
   a focusing lens configured to further focus the light rays from the converging lens to produce the wide-angle projection of the image; and
   a mirror disposed between the converging lens and the focusing lens along a light path and configured to reflect the light rays from the converging lens to the focusing lens; and
an aperture stop positioned to capture the wide-angle projection of the image from the lens assembly.

2. The video unit recited in claim 1, wherein the mirror is configured to wiggle in accordance with a digital micro device of the image creation system.

3. The video unit recited in claim 1, wherein the aperture stop is positioned adjacent an exit pupil of the lens assembly.

4. The video unit recited in claim 1, wherein the separation lens comprises a total internal reflection (TIR) prism.

5. The video unit recited in claim 1, wherein the separation lens comprises a field lens.

6. The video unit recited in claim 1, wherein the video unit comprises a wedge display configured to display the image.

7. The video unit recited in claim 1, wherein the video unit comprises a projection television system.

8. A method, comprising:
creating an image using an image creation system;
producing a meduim wide-angle projection of the image using a lens assembly comprising: a separation lens for receiving light rays relating to the image from the image creation system, for separating illumination components of the light rays from colored light components of the light rays, and for directing the illumination components of the light rays back to the image creation system; an aspherical lens disposed adjacent to the separation lens for causing the light rays from the separation lens to diverge; a compound doublet lens disposed adjacent to the aspherical lens for focusing the light rays from the aspherical lens; a converging lens disposed adjacent to the compound doublet lens for causing the light rays from the compound doublet lens to converge; a focusing lens for further focusing the light rays from the converging lens to produce the wide-angle projection of the image; and a mirror disposed between the converging lens and the focusing lens along a light path for reflecting the light rays from the converging lens to the focusing lens; and
capturing the wide-angle projection of the image from the lens assembly with an aperture stop.

9. The method recited in claim 8, comprising configuring the mirror to wiggle in accordance with a digital micro device of the image creation system.

10. The method recited in claim 8, wherein the aperture stop is positioned adjacent to an exit pupil of the lens assembly.

11. The method recited in claim 8, wherein the meduim wide-angle projection is captured via a wedge display.

12. The method recited in claim 8, comprising increasing brightness of the image via a field lens.

13. The method recited in claim 8, comprising obtaining an optimal modulation transfer function (MTF) for the image.

14. A system, comprising:
means for creating an image;
means for producing a meduim wide-angle projection of the image, comprising:
   means for receiving light rays relating to the image;
   means for separating illumination components of the light rays from colored light components of the light rays;
   means for diverging the light rays to produce diverging light rays;
   means for focusing the diverging light rays to produce focused diverging light rays;
   means for converging the focused diverging light rays to produce focused light rays;
   means for reflecting the focused light rays; and
   means for further focusing the focused light rays to produce the wide-angle projection of the image; and
means for capturing the wide-angle projection of the image with an aperture stop.

15. The system recited in claim 14, wherein the aperture stop is positioned adjacent to an exit pupil of a lens assembly.

16. The system recited in claim 14, wherein an optimal modulation transfer function (MTF) is obtained for the image.

* * * * *